United States Patent [19]
Kimura

[11] Patent Number: 5,982,426
[45] Date of Patent: Nov. 9, 1999

[54] SOLID STATE IMAGE PICKUP DEVICE WITH BUILT-IN SIGNAL AMPLIFIER AND METHOD OF CONTROLLING THEREOF

[75] Inventor: Tetsuji Kimura, Tokyo, Japan

[73] Assignee: NEC Corporation, Tokyo, Japan

[21] Appl. No.: 08/991,050

[22] Filed: Dec. 16, 1997

[30] Foreign Application Priority Data

Dec. 20, 1996 [JP] Japan ................................. 8-341961

[51] Int. Cl.⁶ ............................. H04N 5/217; H04N 3/14
[52] U.S. Cl. ..................... 348/241; 348/300; 348/301; 348/303
[58] Field of Search ................................. 348/241, 243, 348/250, 294, 300, 302, 303, 304, 309, 310, 311, 301; 250/208.1

[56] References Cited

U.S. PATENT DOCUMENTS

| | | | |
|---|---|---|---|
| 4,954,895 | 9/1990 | Akimoto et al. | 348/301 |
| 4,987,321 | 1/1991 | Toohey | 348/241 |
| 5,485,206 | 1/1996 | Nakagawa et al. | 348/301 |
| 5,717,457 | 2/1998 | Morimoto | 348/241 |

FOREIGN PATENT DOCUMENTS 5-284428 10/1993 Japan.

OTHER PUBLICATIONS

NEC Mos Integrated Circuit μPD3720, 2700–BIT×3 CCD Color Linear Image Sensor.

*Primary Examiner*—Wendy Garber
*Assistant Examiner*—Luong Nguyen
*Attorney, Agent, or Firm*—Foley & Lardner

[57] ABSTRACT

A solid state image pickup device with built-in signal amplifier produces an image signal from an output potential signal produced from each charge packet by a charge converting unit, and the built-in signal amplifier includes a sampling-and-hold circuit connected between the charge converting unit and a signal amplifying circuit for changing a potential signal from a reset field-through potential level to a signal potential level, thereby eliminating a reset field-through noise from an input potential signal supplied to the signal amplifier.

2 Claims, 10 Drawing Sheets

SOLID STATE IMAGE PICKUP DEVICE WITH BUILT-IN SIGNAL AMPLIFIER AND METHOD OF CONTROLLING THEREOF

FIELD OF THE INVENTION

This invention relates to a solid state image pickup device and, more particularly, to a solid state image pickup device with built-in signal amplifier and a method of controlling thereof.

DESCRIPTION OF THE RELATED ART

Figure 1:
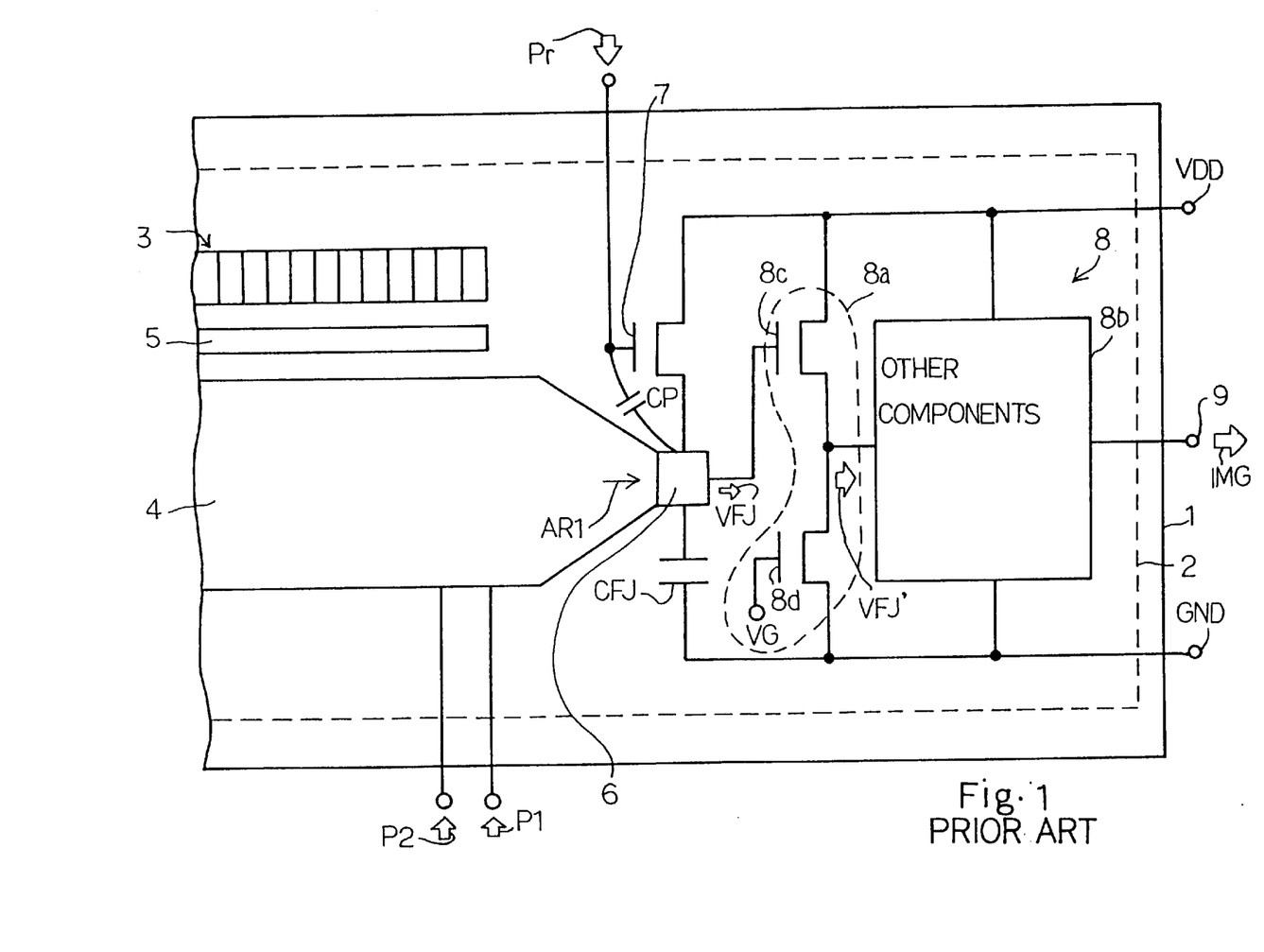
FIG. 1 is a schematic view showing the arrangement of the prior art solid state image pickup device with built-in amplifier.

A solid state image pickup device is an essential component part of an image scanner or a facsimile machine. In order to reduce the production cost, the manufacturer integrates a signal amplifier with the solid state image pickup device on a single semiconductor chip. FIG. 1 illustrates the prior art solid state image pickup device with build-in signal amplifier.

The prior art solid state image pickup device with built-in amplifier is fabricated on a n-type semiconductor substrate 1, and comprises a p-type well 2 doped with boron and photo-electric converting elements 3 arranged in a linear array in the p-type well 2. The photo-electric converting elements 3 convert image-carrying light to signal charge packets, and accumulate the signal charge packets therein.

The prior art solid state image pickup device further comprises a charge transfer unit 4 for conveying the charge packets and a transfer gate unit 5 connected between the photo-electric converting elements 3 and the charge transfer unit 4. The transfer gate unit 5 electrically connects the photo-electric converting elements 3 to the charge transfer unit 4 after lapse of certain accumulating time, and the signal charge packets are transferred from the photo-electric converting elements 3 through the transfer gate unit 5 to the charge transfer region 4. A plurality of charge transfer electrodes (not shown) are provided over the charge transfer region 4, and are capacitively coupled to the charge transfer region 4. A two-phase charge transfer signal P1/P2 is supplied to the charge transfer electrodes, and sequentially changes the potential level thereunder. The signal charge packets are moved from the potential well to the next potential well, and are conveyed in the direction of arrow AR1.

The prior art solid state image pickup device with built-in amplifier further comprises a signal charge converting unit 6 connected to the charge transfer region 4. The signal charge converting unit 6 is implemented by a floating diode amplifier type charge detector, which is usually abbreviated as "FDA". The floating diode amplifier type charge detector is coupled through a capacitor to a ground line, and the signal charge packets are successively supplied to the floating diode amplifier type charge detector. The floating diode amplifier type charge detector converts each charge packet to a potential level corresponding to the amount of signal charge packet. Thus, the charge converting unit 6 produces an output potential signal VFJ from the series of signal charge packets.

The prior art solid state image pickup device with built-in amplifier further comprises a reset transistor 7 connected between the charge converting unit 6 and a power supply line VDD and an output amplifier circuit 8 connected between the charge converting unit 6 and an output terminal 9. A reset signal Pr is periodically supplied to the gate electrode of the reset transistor 7, and a power supply level Vdd is introduced into the charge converting unit 6 so as to cancel residual signal charge. The output amplifier circuit 8 is responsive to the output potential signal VFJ for outputting an image signal IMG from the output terminal 9.

The output amplifier circuit 8 includes a first-stage emitter follower 8a connected between the power supply line VDD and the ground line GND and other components 8b. The emitter follower 8a is implemented by a series of field effect transistors 8c and 8d. The output potential signal VFJ is supplied to the gate electrode of the field effect transistor 8c, and the gate electrode of the other field effect transistor 8d is connected to a constant potential source VG. The emitter follower 8a is responsive to the output potential signal VFJ, and supplies an output potential signal VFJ' to the other components. The other components are signal potential amplifier, a source follower, a reset field-through level clamping circuit and so forth.

Figure 2:
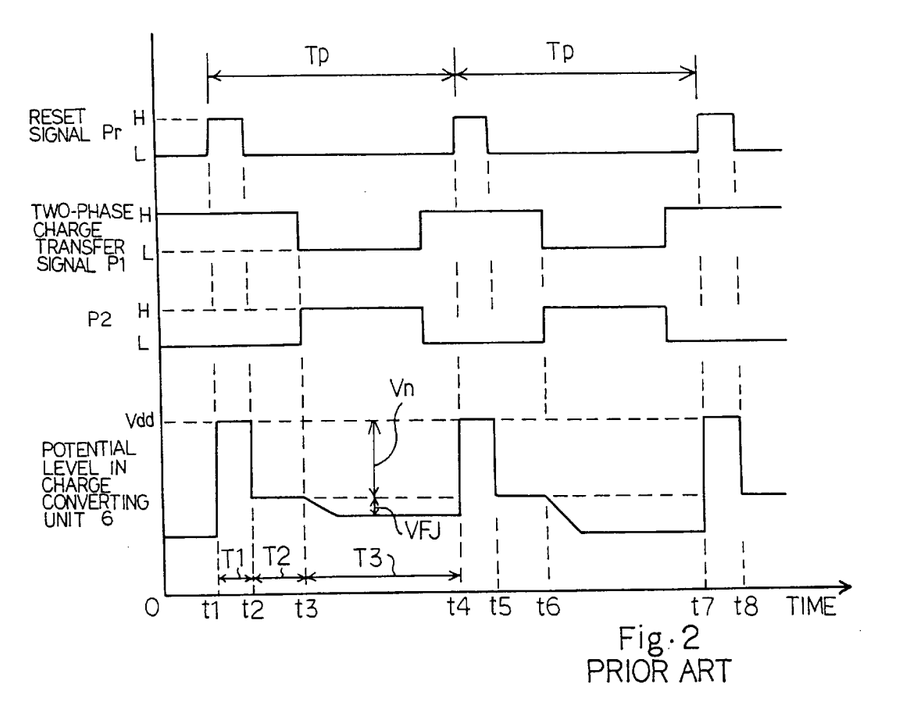
FIG. 2 is a timing chart showing the behavior of the output amplifier circuit incorporated in the prior art solid state image pickup device.

The prior art solid state image pickup device with built-in amplifier behaves as follows. FIG. 2 illustrates the behavior of the output amplifier circuit 8. The reset signal Pr rises at time t1, t4, t7, . . . , and falls down at time t2, t5, t8, . . . The transfer signal P1 falls down at time t3, t6, . . . , and each charge packet is converted to the potential level in a pixel frame Tp between the pulse rise of the reset signal Pr and the next pulse rise.

Each pixel frame is divided into three time periods T1, T2 and T3. The three time periods T1, T2 and T3 are called as "reset term", "reset field-through term" and "signal term", respectively. The reset signal Pr is maintained at the high level in the reset term T1, and the charge converting unit 6 is charged through the field effect transistor 8c to the power potential level Vdd. The charge converting unit 6 is waiting for the charge packet in the reset field-through term T2. The charge packet is supplied to the charge converting unit 6, and the capacitor CFJ converts the charge packet to potential level corresponding to the amount of charge packet in the signal term T3. The potential level is output from the charge converting unit 6 as the output potential signal VFJ.

When the reset signal Pr falls down, the potential level in the charge converting unit 6 is decreased from the power potential level Vdd to a certain level, and the potential difference is called as "reset field-through noise Vn". The charge packet causes the potential level in the charge converting unit 6 to fall down to another certain level, and the potential level between the certain level and another certain level is corresponding to the amount of charge packet. In other words, the potential difference is equivalent to the amplitude of the output potential signal OUT.

The reset field-through noise Vn is caused by the followings. A coupling capacitance CP takes place between the gate electrode of the reset transistor 7 and the charge converting unit 6 (see FIG. 1), and produces coupling noise at the potential fall of the reset pulse Pr. While the reset transistor 7 is turned on so as to supply the power potential level Vdd to the charge converting unit 6, thermal noise flows from the channel region of the reset transistor 7 to the charge converting unit 6, and is superposed on the output potential level VFJ. Thus, the output potential level VFJ fluctuates due to the thermal noise, and the random noise forms a part of the reset field-through noise Vn. When the reset transistor 7 turns off, a part of electron just passing the channel region is pushed out toward the charge converting unit 6, and the random noise form another part of the reset field-through noise Vn.

The reset field-through noise Vn ranges from 400 millivolt to 500 millivolt, and fluctuates over the pixel frames Tp by several millivolt to 10 millivolts. Thus, the reset field-through noise Vn is typical random noise of the image signal IMG of the prior art solid state image pickup device.

Figure 3:
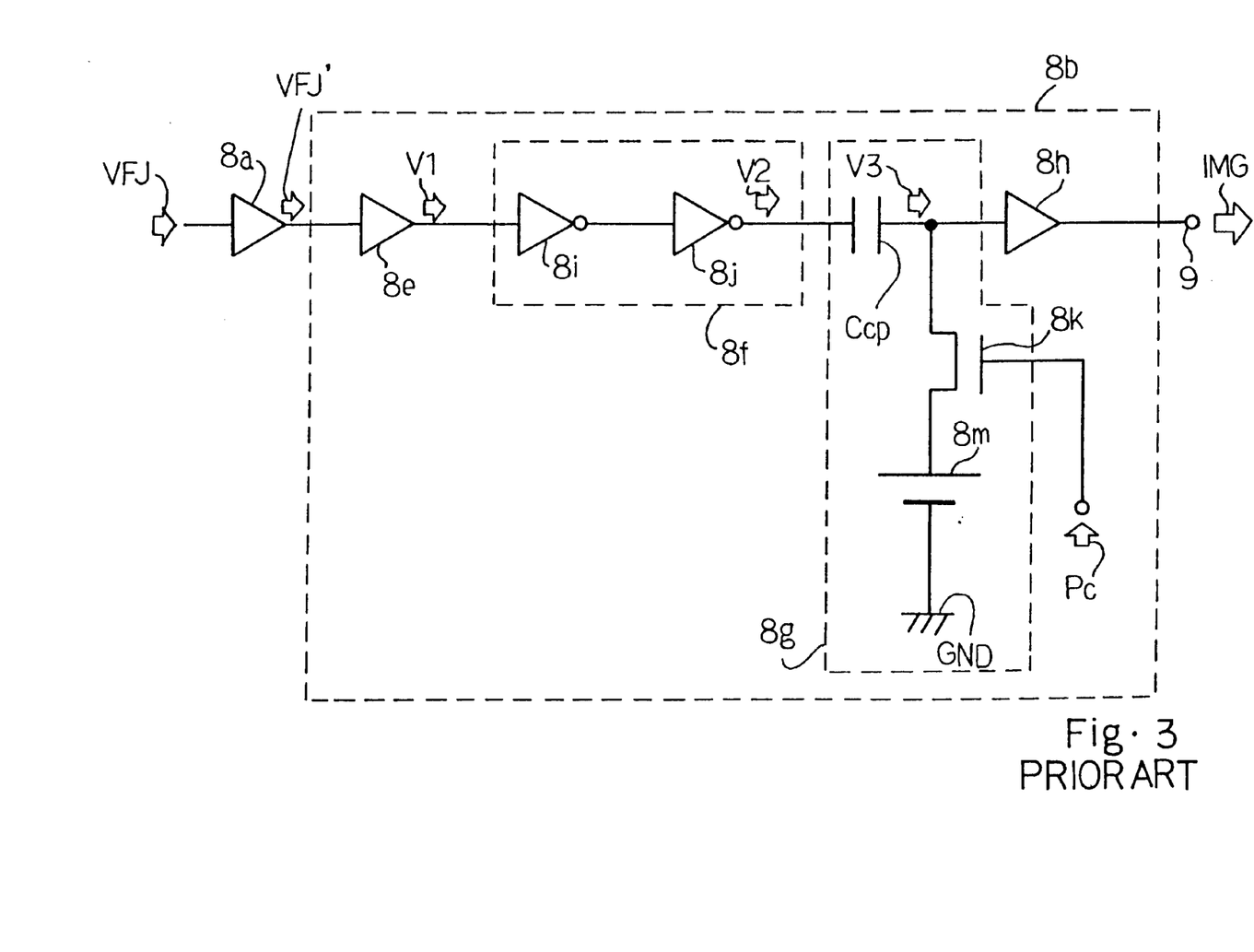
FIG. 3 is a circuit diagram showing the output amplifier circuit incorporated in the prior art solid state image pickup device.

FIG. 3 illustrates the other components 8b of the output amplifier circuit 8. The other components 8b are a source follower 8e connected to the first-stage source follower 8a, a signal charge amplifier 8f connected to the source follower 8e and a reset field-through clamping circuit 8g connected to the signal charge amplifier 8f and a source follower 8h connected between the reset field-through clamping circuit 8g and the output terminal 9. The signal charge amplifier 8f is implemented by a series of inverters 8k/8j, and an n-channel type MOS inverter serves as each of the inverters 8i/8j.

The reset field-through clamping circuit 8g includes a capacitor connected between the inverter 8j and the source follower 8h and a series of field effect transistor 8k and a potential source 8m connected between the input node of the source follower 8h and the ground line GND. A clamping pulse Pc is supplied to the gate electrode of the field effect transistor 8k, and the reset field-through clamping circuit 8g clamps the potential level at the input node of the source follower 8h at a constant potential level VC in each field-through term T2. The reason why the reset field-through clamping circuit 8g is incorporated in the prior art solid state image pickup device with built-in amplifier is the elimination of the random noise produced due to the reset transistor 7, the charge converting unit 6 and other component field effect transistors of the output amplifier circuits 8. For this reason, it is desirable to locate the reset field-through clamping circuit 8g as close to the output terminal 9 as possible.

Figure 4:
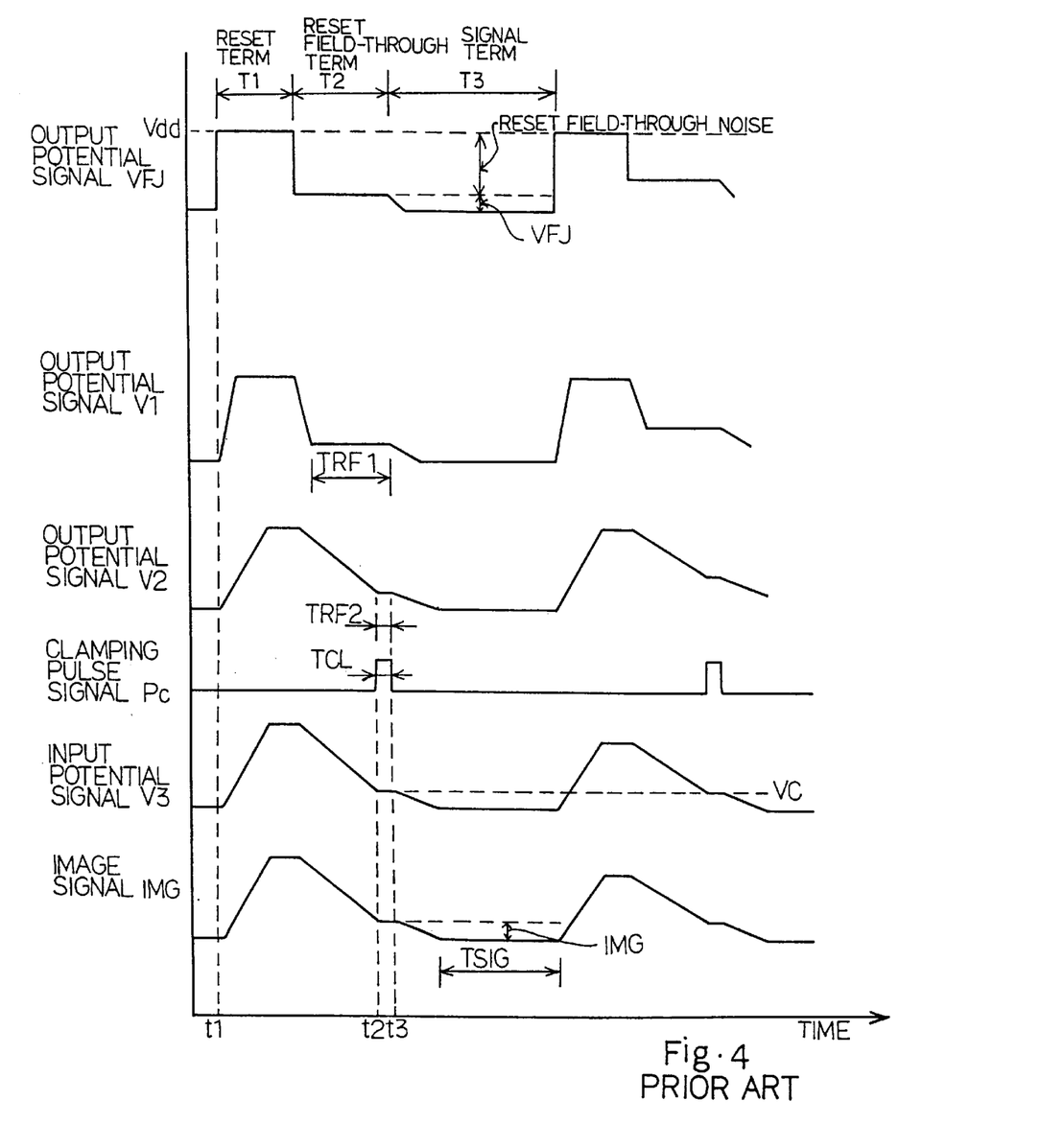
FIG. 4 is a timing chart showing the essential signals of the output amplifier circuit.

FIG. 4 illustrates essential signals of the output amplifier circuit 8. The output potential signal of the source follower 8e, the output potential signal of the inverter 8j and the input potential signal of the source follower 8h are labeled with V1, V2 and V3, respectively. The output potential signal VFJ is reset to the power potential level Vdd at time t1, and the pulse rise and the pulse decay become milder from the output potential signal VFJ through the output potential signal V1 to the output potential signal V2. For this reason, the reset field-through term TRF1 of the output potential signal V1 is shorter than the reset field-through term T2, and the reset field-through term TRF2 of the output potential signal V2 is shorter than the reset field-through term TRF1. The clamping pulse signal Pc is changed to the high level at time t2, and falls down at time t3. As a result, the reset field-through clamping circuit 8g adjusts the output potential signal V3 to the potential level of the output potential signal V2 in the reset field-through term TRF2, and eliminates the random noise from the output potential signal V3.

However, the reset field-through term becomes shorter through the source follower 8e and the inverters 8i/8j. If the prior art solid state image pickup device transfers the charge packets to the charge converting unit 6 at higher speed, the pixel frame Tp and the reset field-through term T2 become shorter. The source follower 8e and the inverters 8i/8j decrease the reset field-through term TRF2, and the reset field-through clamping circuit 8g hardly catches up the potential level in the reset field-through term TRF2.

The reset field-through noise is assumed to be 400 millivolt. If the prior art solid state image pickup device is incorporated in a facsimile machine or an image scanner, the image signal IMG is of the order of 1.0 volt. The output amplifier circuit 8 is expected to produce the image signal IMG at least ten times larger than the output potential signal VFJ. Therefore, the output potential signal VFJ is of the order of 100 millivolt. The source follower 8e and the inverters 8i/8j are assumed to introduce time delay of 5 nanosecond per 100 millivolt. The source follower 8e and the inverters 8i/8j retard the signal propagation by 200 nanosecond, i.e., (4 V/100 mV)×5 ns. The reset field-through term TRF2 is shorter than the reset field-through term T2 by 200 nanosecond.

In this situation, if MOS field effect transistors form the reset field-through clamping circuit 8g, margin is taken into account between the reset field-through term TRF2 and the clamping pulse Pc, and the reset field-through clamping circuit 8g requires the pulse width TCL of the order of 50 nanosecond. For this reason, the prior art reset field-through clamping circuit 8g requires at least 250 nanosecond. The charge transfer unit 6 requires at least 30 nanosecond for the reset to the power potential level Vdd, and the prior art output amplifier circuit 8 requires at least 280 nanosecond for the reset term T1 and the reset field-through term T2.

The signal term T3 is also affected by the source follower 8e and the inverters 8i/8j. The output potential signal V2 is expected to change the potential level within 1 volt, and the time delay is calculated as (1 V/100 mV)×5 ns=50 nanosecond. The image signal IMG is stable during term TSIG shorter than the signal term T3 by 50 nanosecond. The transient period between the reset field-through term T2 and the signal term T3 is about 40 nanosecond. The image signal IMG is, by way of example, processed through a sample-and-hold circuit, and at least 50 nanosecond is required. The signal period T3 is at least 50+40+50=140 nanosecond. Thus, the prior art solid state image pickup device with built-in amplifier requires 420 nanoseconds, i.e., 280+140 nanoseconds for each pixel frame, and the maximum data rate is 2.38 MHz.

Figure 5:
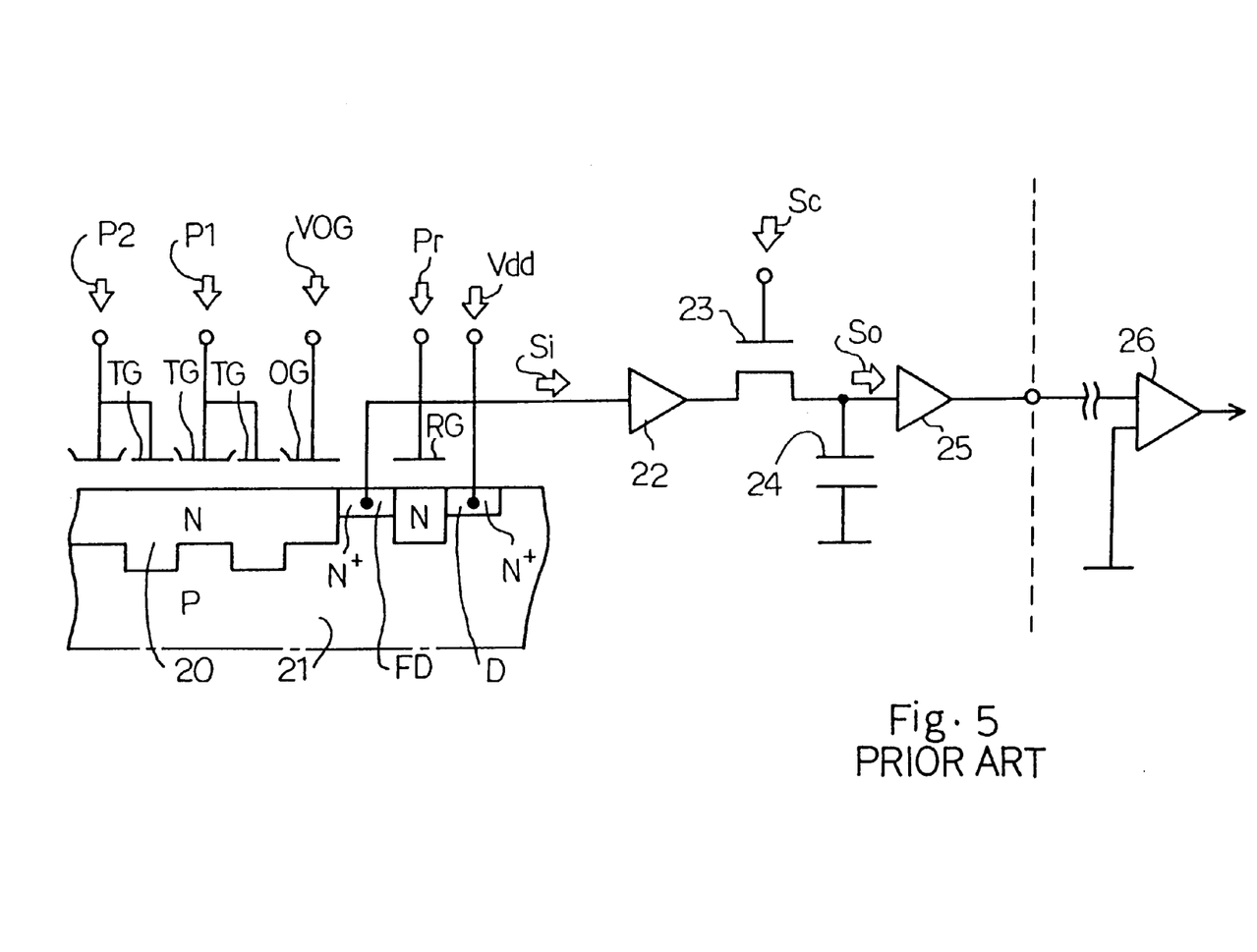
FIG. 5 is a schematic view showing the arrangement of the prior art solid state image pickup device disclosed in Japanese Patent Publication of Unexamined Application No. 5-284428.

Japanese Patent Publication of Unexamined Application No. 5-284428 proposes another prior art solid state image pickup device from which the influence of the reset field-through noise is eliminated. FIG. 5 illustrates the prior art solid state image pickup device disclosed in the Japanese Patent Publication of Unexamined Application.

A charge transfer register region 20 is formed in a p-type well. Charge transfer electrodes TG and an output gate electrode OG are capacitively coupled to the charge transfer register region 20, and charge transfer pulse signals P1/P2 are selectively applied to the charge transfer electrodes TG so as to convey charge packets from potential well to potential well created under the charge transfer electrodes TG. A floating diffusion region FD is continuous to the charge transfer register region 20, and an output signal VOG controls a final potential well to the floating diffusion region FD. A reset transistor RG spaces the floating diffusion region FD from a drain region D, and a reset pulse Pr is periodically applied to the gate electrode of the reset transistor RG.

An input node of an output amplifier 22 is connected to the floating diffusion region FD, and an output node of the output amplifier 22 is further connected to a sampling transistor 23. The sampling transistor 23 is gated with a sampling signal Sc, and the sampling transistor 23 is further connected to a capacitor 24 and an input node of an inverter gain amplifier 25. The capacitor 24 is further connected to a constant potential line, and an output node of the inverter gain amplifier 25 is connected to an operational amplifier 26.

Figure 6:
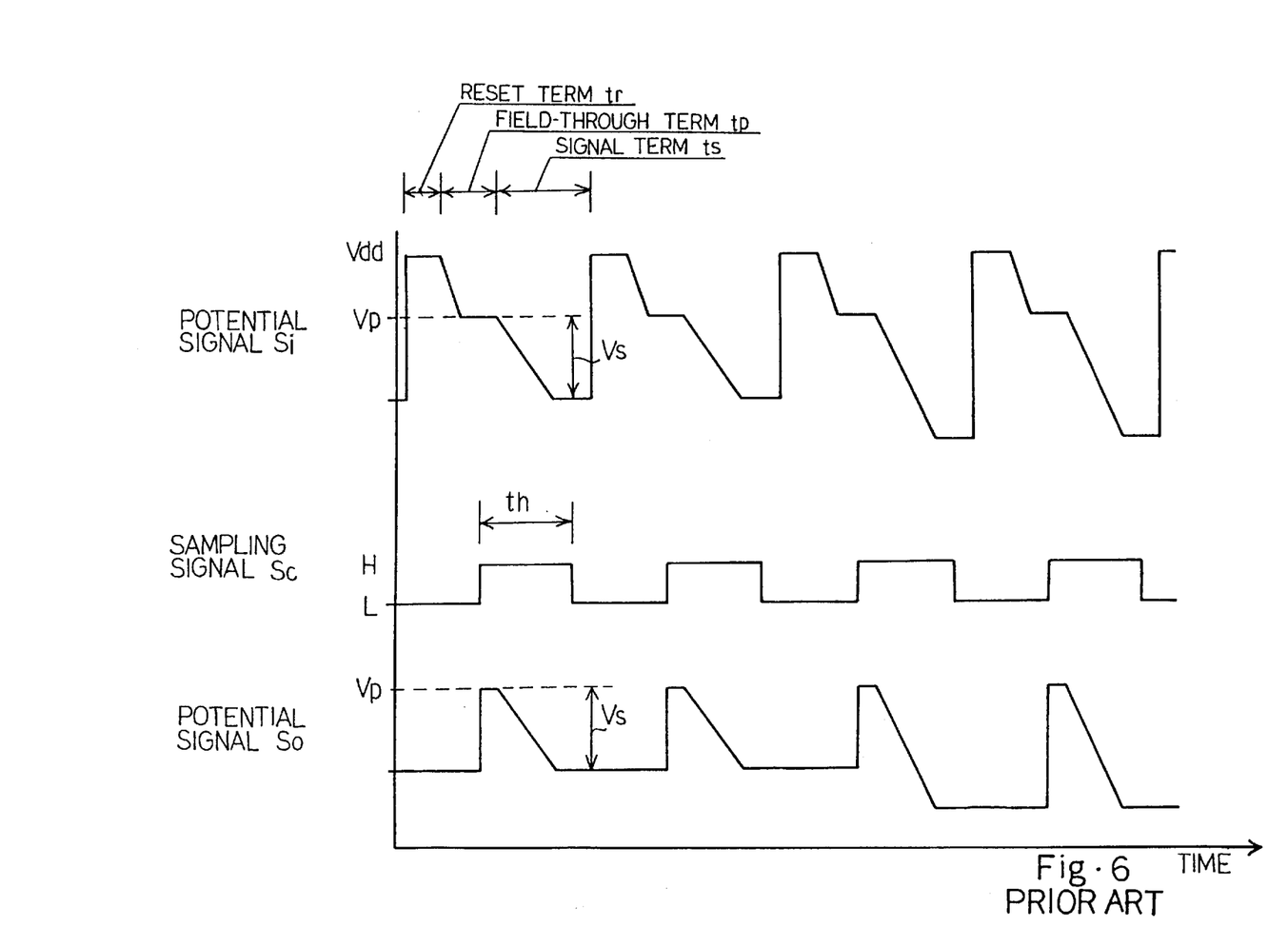
FIG. 6 is a timing chart showing the behavior of the prior art solid state image pickup device.

FIG. 6 illustrates the waveform of a potential signal Si of the floating diffusion region FD, the waveform of the sampling signal Sc and the waveform of a potential signal So. A reset field-through noise is perfectly eliminated from each pixel frame. In order to prolong the signal term Ts, the potential level in the reset field-through term tr, the signal term ts and the transient period therebetween is sampled with the sampling signal Sc so as to transfer the potential level Vs in the signal term ts to the potential signal So.

The prior art solid state image pickup device merely prolongs the signal term ts, and the reset field-through term tp is never increased. For this reason, even if the technologies disclosed therein is applied to the prior art solid state image pickup device shown in FIGS. 1 to 4, the time period for the potential clamp is never increased, and the reset field-through clamping circuit 8g fails to catch up the potential level. Moreover, the pixel frame contains the transient time period between the reset field-through term tp and the signal term ts, and the transient time period is affected by the timings of charge transfer pulse signals P1/P2 and the input capacitance of the shift register on the charge transfer region 20. For this reason, the signal term ts is varied. The short clamping time period and the variable signal term ts do not allows the manufacturer to increase the data rate.

SUMMARY OF THE INVENTION

It is therefore an important object of the present invention to provide a solid state image pickup device which is increased in data rate.

It is also an important object of the present invention to provide a method of controlling the solid state image pickup device.

To accomplish the object, the present invention proposes to sample and hold a potential level in a reset field-through term and a potential level in a signal term.

In accordance with one aspect of the present invention, there is provided a solid state image pickup device fabricated on a single semiconductor chip and comprising a photo-electric converting unit converting incident light to photo carrier, a charge converting unit periodically reset to a certain potential level and producing an output potential signal from a series of charge packets having a potential level and further comprising a reset term for changing the potential level thereof to the certain potential level, a signal term for changing the potential level thereof from a reset field-through level to a signal potential level representative of the amount of the each charge packet and a reset field-through term provided between aforesaid reset term and the signal term for maintaining the potential level thereof to the reset field-through level, a charge transfer means electrically connected between the photo-electric converting unit and the charge converting unit and conveying the photo carrier from the photo-electric converting unit to the charge converting unit as the series of charge packets, and an output amplifier circuit electrically connected to the charge converting unit for producing an image signal from the output potential signal and including a signal amplifying circuit for increasing a magnitude of a potential signal, a reset field-through clamping circuit electrically connected to the signal amplifying circuit and providing a reference potential level corresponding to the reset field-through level for changing the image signal from the reference potential level and a noise eliminating circuit electrically connected between the charge converting unit and the signal amplifying circuit and having a sampling-and-hold circuit for transferring a first potential level in the reset field-through term and a second potential in the signal term to the potential signal.

In accordance with another aspect of the present invention, there is provided a method of controlling a solid state image pickup device with built-in signal amplifier, comprising the steps of: a) resetting a charge converting unit connected through a charge transferring unit to a photo-electric converting means to a reset potential level; b) changing the reset potential level to a reset field-through potential level; c) sampling the reset field-through potential level for regulating a potential signal to a reference potential level, d) changing the reset field-through potential level to a first signal potential level corresponding to the amount of each charge packet supplied from the photo-electric converting means to the charge converting unit; e) sampling the first signal potential level for changing the potential signal from the reference potential level to a second signal potential level correspononding to the first signal potential level; and f) outputting an image signal changed from a clamped reference potential level to a third signal potential level corresponding to the second signal potential level.

BRIEF DESCRIPTION OF THE DRAWINGS

The features and advantages of the solid state image pickup device and the method of controlling thereof will be more clearly understood from the following description taken in conjunction with the accompanying drawings in which.

DESCRIPTION OF THE PREFERRED EMBODIMENTS

First Embodiment

Figure 7:
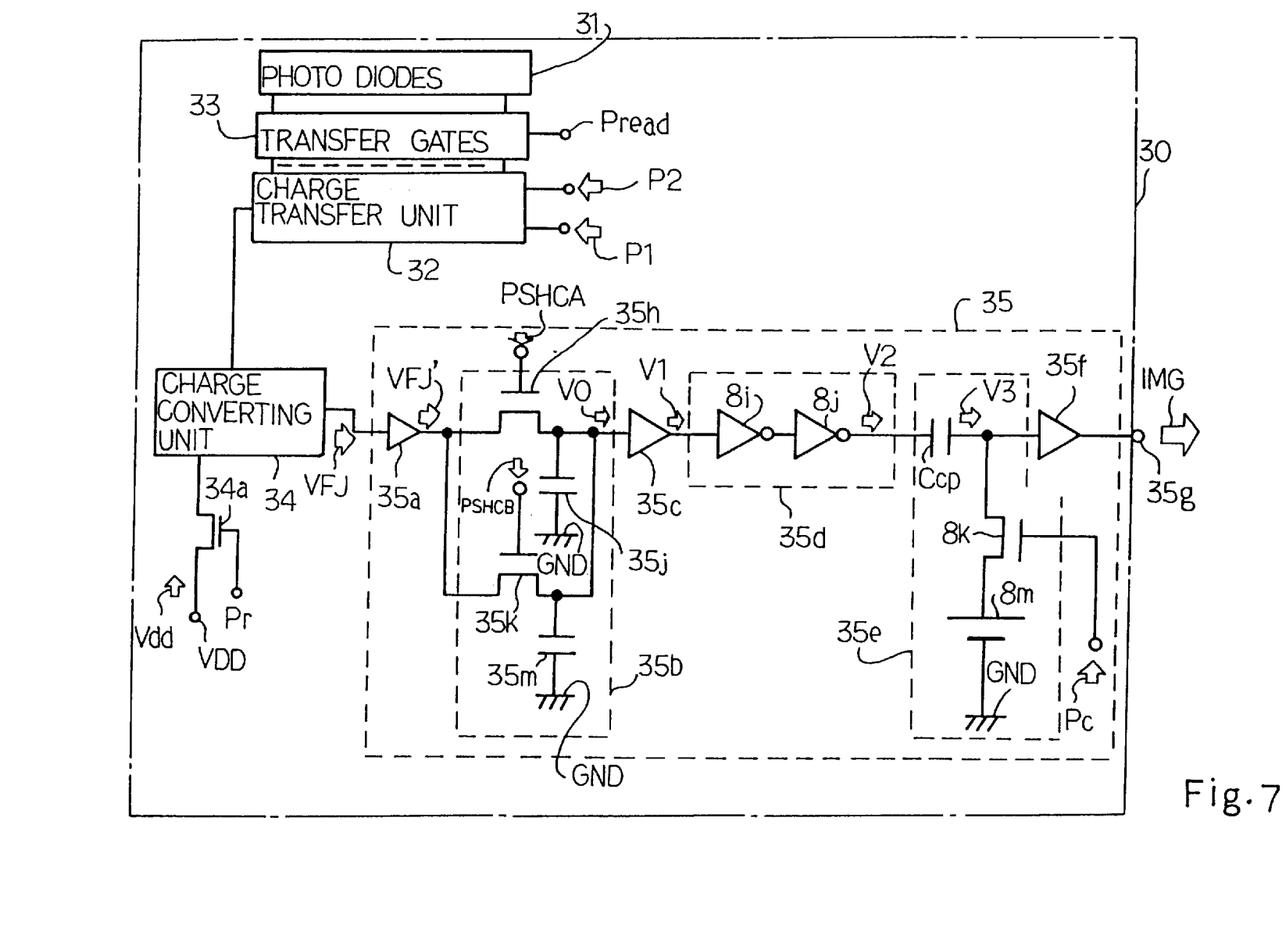
FIG. 7 is a circuit diagram showing the arrangement of a solid state image pickup device according to the present invention.

Referring to FIG. 7 of the drawings, a solid state image pickup device embodying the present invention is fabricated on a semiconductor substrate 30, and serves as a linear image sensor. The solid state image pickup device largely comprises photo diodes 31, a charge transfer unit 32, transfer gates 33 connected between the photo diodes 31 and the charge transfer unit 32 and a charge converting unit 34 connected to the charge transfer unit 32

Image-carrying light is fallen onto the photo diodes, and the photo diodes 31 convert the image-carrying light to photo carrier. The transfer gates 33 are concurrently responsive to a read-out control signal Pread so as to transfer the photo carrier to the charge transfer unit 32, and the photo carrier forms charge packets in the charge transfer unit 32. The charge transfer unit 32 is responsive to a charge transfer pulse signal P1/P2 so as to convey the charge packets to a charge transfer unit 32 from stage to stage, and successively flows into the charge converting unit 34. The charge converting unit 34 converts each charge packet to a potential level corresponding to the amount thereof, and produces an output potential signal VFJ from the series of charge packets. The photo diodes 31, the charge transfer unit 32, the transfer gates 33 and the charge converting unit 34 are similar to those of the prior art solid state image pickup device, and, for this reason, no further description is incorporated hereinbelow.

The charge converting unit 34 has a reset transistor 34a, and the reset transistor 34a is responsive to a reset signal Pr so as to periodically reset the charge converting unit 34 to a power voltage level Vdd.

The solid state image pickup device further comprises an output amplifier circuit 35. The output amplifier circuit 35 is connected to the charge conveying unit 34, and produces an image signal IMG from the output potential signal VFJ. The output potential signal VFJ representative of the amount of each charge packet is processed by the output amplifier circuit 35 in a pixel frame, and the pixel frame is divided into a reset term TRST, a reset field-through term TRFFJ and a signal term TSIGFJ.

The output amplifier circuit 35 includes a first-stage source follower 35a coupled to the charge converting unit 34, and the first-stage source follower 35a produces an output potential signal VFJ' from the output potential signal VFJ.

The output amplifier circuit further includes a noise eliminating circuit 35b connected to the first-stage source follower 35a, an inter mediate-stage source follower 35c connected to the noise eliminating circuit 35b, a signal charge amplifier 35d connected to the intermediate-stage source follower 35c, a reset field-through clamping circuit 35e connected to the signal charge amplifier 35d, a final-stage source follower 35f connected between the reset field-through clamping circuit 35e and an Output terminal 35g. The intermediate-stage source follower 35c, the signal charge amplifier 35d, the reset filed-through clamping circuit 35e and the final-stage source follower 35f are similar to the source follower 8e, the signal charge amplifier 8f, the reset field-through clamping circuit 8g and the source follower 8h, respectively, and components of those circuits 35d/35e are labeled with the same references designating corresponding circuit components of the corresponding circuits 8f/8g without detailed description.

The noise eliminating circuit 35b includes two sample-and-hold circuits. The first sample-and-hold circuit has a transfer transistor 35h connected between the first-stage source follower 35a and the intermediate-stage source follower 35c and a capacitor 35j connected between the input node of the intermediate-stage source follower 35c and the ground line GND. The transfer transistor 35h is responsive to a sampling control signal PSHCA so as to transfer the potential level of the output potential signal VFJ' to the capacitor 35j. The sampling control signal PSHCA is changed to active level in the reset field-through term TRFFJ, and the potential level in the reset field-through term TRFFJ is stored in the capacitor 35j.

The second sample-and-hold circuit has a transfer transistor 35k connected between the first-stage source follower 35a and the intermediate-stage source follower 35c and a capacitor 35m connected between the input node of the intermediate-stage source follower 35c and the ground line GND. Thus, the second sample-and-hold circuit is connected in parallel to the first sample-and-hold circuit. The transfer transistor 35k is responsive to a sampling control signal PSHCB so as to transfer the potential level of the output potential signal VFJ' to the capacitor 35m. The sampling control signal PSHCB is changed to the active level in the signal term TSIGFJ, and the potential level in the signal term TSIGFJ is stored in the capacitor 35m.

Figure 8:
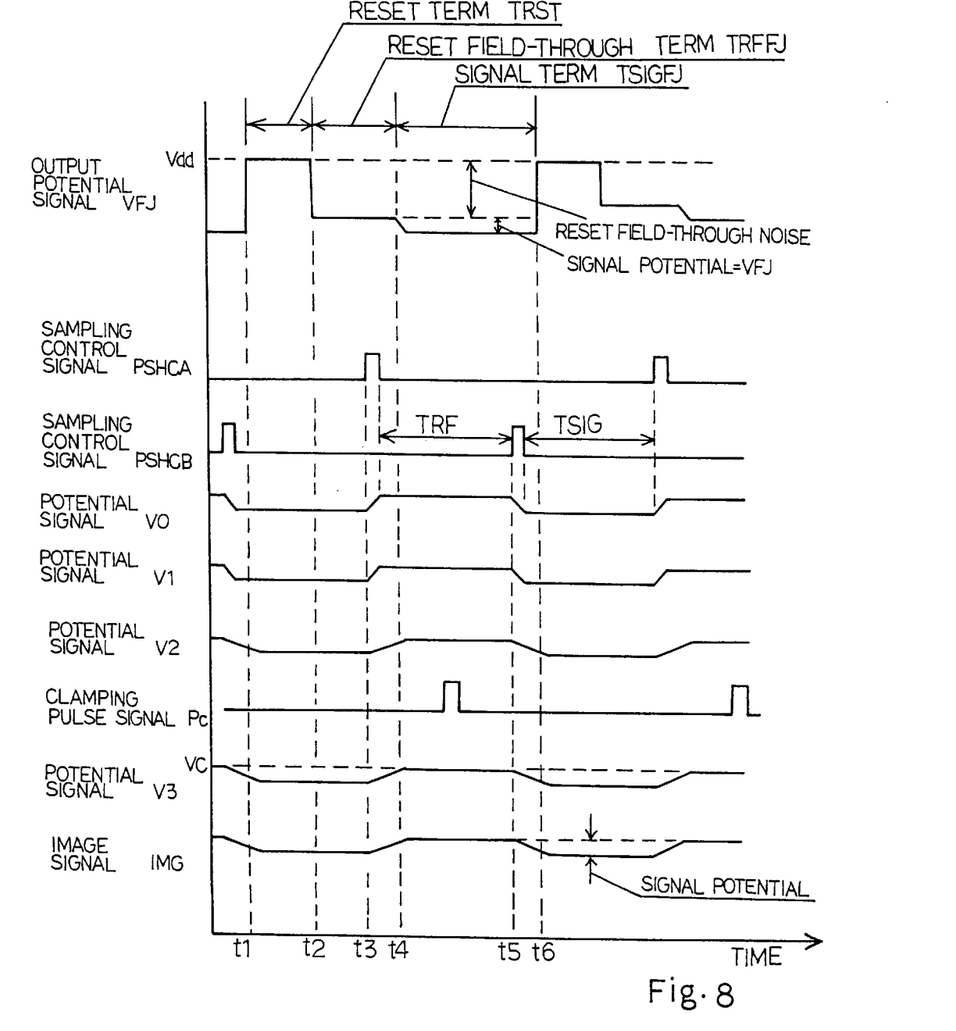
FIG. 8 is a timing charge showing the behavior of an Output amplifier circuit incorporated in the solid state image pickup device.

FIG. 8 illustrates the behavior of output amplifier circuit 35. A pixel frame starts at time t1, and the charge converting unit 34 is reset to the power potential level Vdd. The charge converting unit 34 enters into the reset field-through term TRFFJ at time t2, and reset field-through noise takes place. The charge converting unit 34 enters into the signal term TSIGFJ at time t4, and the potential level of the output potential signal VFJ is decayed from the reset field-through level by a signal potential equivalent to the amount of charge packet. The charge converting unit 34 is reset to the positive potential level Vdd at time t6, again.

The sampling control signal PSHCA is changed from the low level to the high level at time t3 in the reset field-through term TRFFJ. Then, the transfer transistor 35h turns on, and the output potential signal VFJ' is sampled. When the sampling control signal PSHCA is changed from the high level to the low level, the capacitor 35j holds the potential level in the reset field-through term TRFFJ.

The sampling control signal PSHCB is changed from the low level to the high level at time t5 in the signal term TSIGFJ. The transfer transistor 35k turns on, and the output potential signal VFJ' is sampled. When the sampling control signal PSHCB is changed to the low level, the capacitor 35m holds the potential level in the signal term TSIGFJ.

The capacitor 35j maintains the output potential signal VO at the potential level equal to that of the output potential signal VFJ' in the reset field-through term TRFFJ between the pulse fall of the sampling control signal PSHCA and the pulse rise of the sampling control signal PSHCB. Thus, the two sampling-and-hold circuits changes the reset field-through term TRFFJ of the output potential signal VFJ' to a reset field-through term TRF of the potential signal VO, and eliminates the reset field-through noise from the potential signal VO.

Similarly, the capacitor 35m maintains the output potential signal VO at the potential level equal to that of the output potential signal VFJ' in the signal term TSIGFJ between the pulse fall of the sampling control signal PSHCB and the pulse rise of the sampling control signal PSHCA. Thus, the two sampling-and-hold circuits further changes the signal term TSIGFJ of the output potential signal VFJ' to a signal term TSIG of the potential signal VO. Thus, the reset field-through term TRF and the signal term TSIG are defined by the sampling control signals PSHCA/PSHCB, and are variable with the sampling control signals PSHCA/PSHCB.

The potential signal VO is supplied through the intermediate source follower 35c and the signal amplifier 35d to the reset field-through clamping circuit 35e, and the reset field-through clamping circuit 35e produces the potential signal V3. The potential signal V3 changes the potential level between the reset field-through level and the signal potential level equivalent to the amount of each charge packet, and the potential signal V3 and, accordingly, the image signal IMG do not contain the reset field-through noise.

The output amplifier circuit 35 is assumed to behave under the same conditions as the prior art, i.e., the cain is ten, the image signal changes the potential level within 1 volt and the source follower/inverter introduce time delay of 5 nanosecond per 100 millivolt. Time delay in each of the reset field-through term and the signal term is (1 V/100 millivolt)×5 nanoseconds=50 nanoseconds. The clamping pulse signal Pc has the pulse width of 50 nanosecond, and the reset field-through term TRF is 50+50=100 nanoseconds. A sample-and-hold circuit (not shown) is assumed to require 50 nanosecond for the signal processing, and the signal term TSIG is 50+50=100 nanoseconds. The sampling control signals PSHCA/PSHCB have the pulse width of 30 nanoseconds. The total time period to be required is 100+100+30+30=260 nanoseconds, and the data rate is 3.85 MHz. Thus, the solid state image pickup device according to the present invention processes the image 1.6 times faster than the prior art solid state image pickup device.

Second Embodiment

Figure 9:
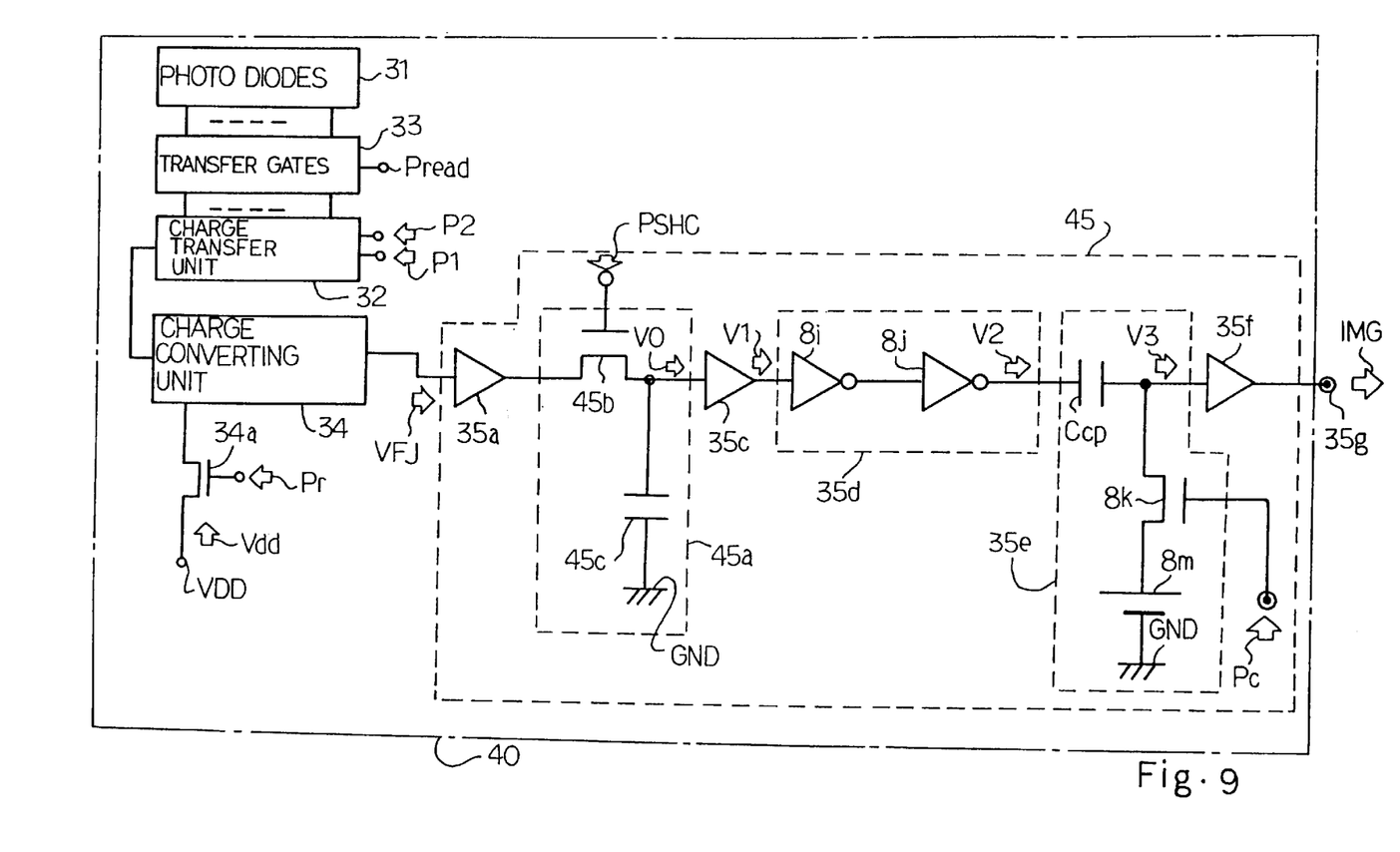
FIG. 9 is a circuit diagram showing the arrangement of another solid state image pickup device according to the present invention.

FIG. 9 illustrates the arrangement of another solid state image pickup device fabricated on a single semiconductor chip 40. The solid state image pickup device implementing the second embodiment is similar to the first embodiment except for an output amplifier circuit 45. For this reason, the other component units are labeled with the same references designating corresponding units of the first embodiment without detailed description.

A noise eliminating circuit 45a is only one difference between the output amplifier circuit 35 and the output amplifier circuit 45. For this reason, the other circuit components are labeled with the same references designating the corresponding circuit components of the output amplifier circuit 35, and description is focused on the noise eliminating circuit 45a.

The noise eliminating circuit 45a includes a transfer transistor 45b connected between the first-stage source follower 35a and the intermediate-stage source follower 35c and a capacitor 45c connected between the input node of the intermediate-stage source follower 35c and the ground line GND. Thus, the noise eliminating circuit 45a is implemented by only one sample-and-hold circuit.

A sampling control signal PSHC is applied to the gate electrode of the transfer transistor 45b, and the transfer transistor 45b turns on in the present of the sampling control signal PSHC at high level. The transfer transistor 45b supplies the potential level of the output potential signal VFJ' to the capacitor 45c, and is held therein.

Figure 10:
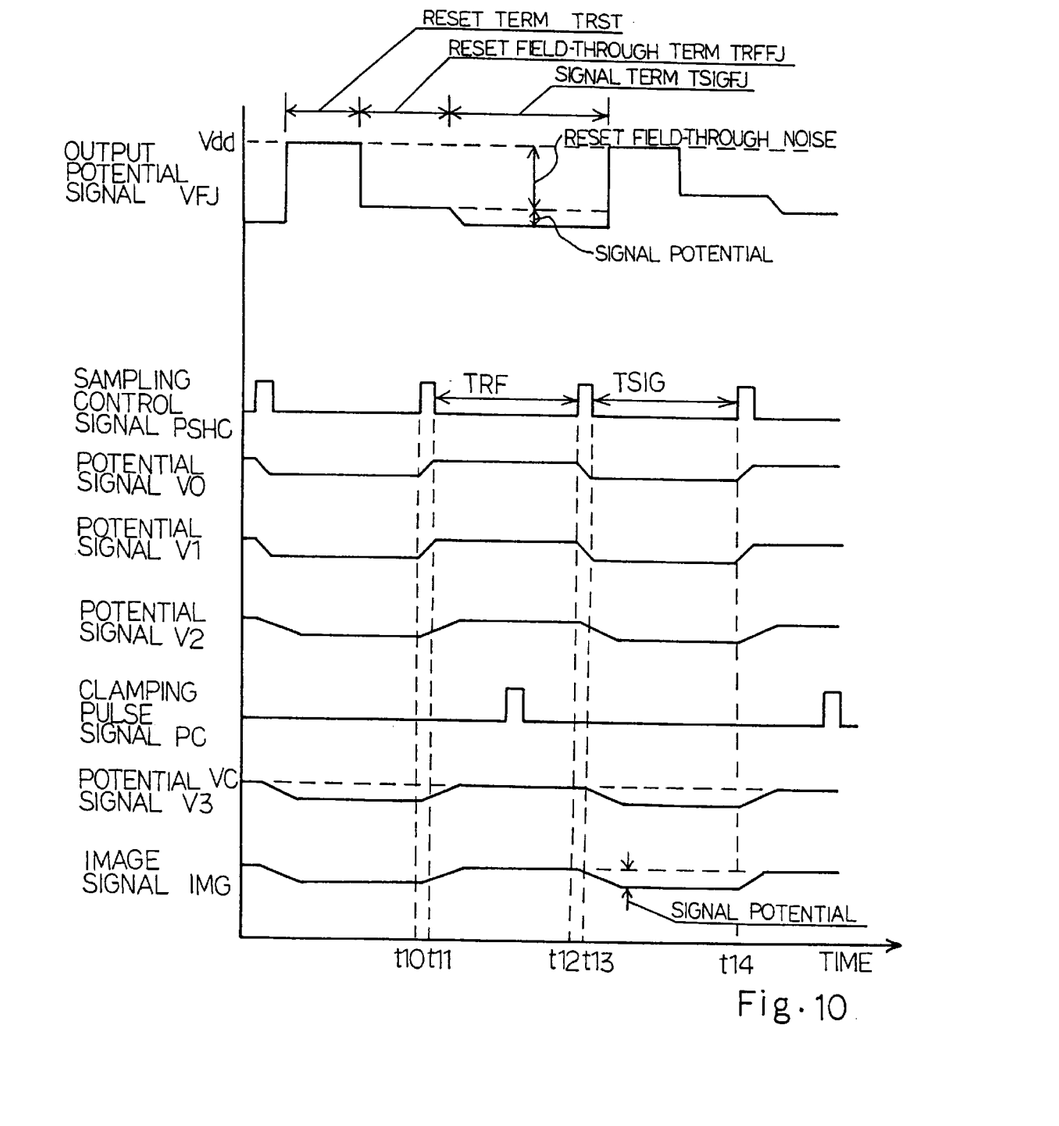
FIG. 10 is a timing chart showing the behavior of an output amplifier circuit incorporated in the solid state image pickup device shown in FIG. 9.

FIG. 10 illustrates the behavior of the output amplifier circuit 45. In this instance, the sampling clock signal PSHC is twice changed to the high level at times t10 and t12 in each pixel frame. The first pulse rise is in the reset field-through term TRFFJ, and the second pulse rise is in the signal term TSIGFJ. The sampling clock signal PSHC is recovered to the low level at times t11 and t13, and defines a reset field-through term TRF between time t11 and time t12 and a signal term TSIG between time t13 and time t14. Thus, the sampling control signal PSHC is changed between the high level and the low level at a certain frequency twice as many as the first/second sampling control signals PSHCA/PSHCB, and serves as the first sampling control signal PSHCA and the second sampling control signal PSHCB. The capacitor 45b holds not only the potential level in the reset field-through term TRFFJ but also the potential level in the signal term TSIGFJ.

In detail, the sampling control signal PSHC is changed to the high level at time t10, and the output potential signal VFJ is held in the capacitor 45c at time t11. The capacitor 45c maintains the potential level in the reset field-through term TRFFJ between time t11 and time t12. Thus, the sampling-and-hold circuit introduces time delay in the potential signal VO, and eliminates the reset field-through noise from the potential signal VO.

The sampling control signal PSHC is changed to the high level at time t12, again, and the output potential signal VFJ in the signal term TSIGFJ is held in the capacitor 45c at time t13. The capacitor 45c maintains the potential level in the signal term TTSIGFJ between time t13 and time t14. Thus, the sampling-and-hold circuit introduces time delay in the potential signal VO, and defines the signal term TSIG in the potential signal VO.

As will be appreciated from the foregoing description, the noise eliminating circuit 35b/45a samples the output potential signal VFJ in response to the sampling control signal PSHC or signals PSHCA/PSHCB, and exactly transfers the potential level in the reset field-through term TRFFJ and the potential level in the signal term TSIGFJ to the potential signal VO. Moreover, the noise eliminating circuit 35b/45a transfers the potential level in the reset field-through term TRFFJ and the potential level in the signal term TSIGFJ to the potential signal VO, and eliminates the reset field-through noise from the potential signal VO. For this reason, even if the data rate is increased, the output amplifier circuit 35/45 exactly produces the image signal IMG from the output potential signal VFJ.

The reset field-through term TRF and the signal term TSIG is appropriately defined by changing the sampling control signal or signals.

Although particular embodiments of the present invention have been shown and described, it will be obvious to those skilled in the art that various changes and modifications may be made without departing from the spirit and scope of the present invention.

For example, the output amplifier circuit according to the present invention may be incorporated in a solid state image pickup device serving as an area sensor.

What is claimed is:

1. A solid state image pickup device fabricated on a single semiconductor chip, comprising:

a photo-electric converting unit converting incident light to a photo carrier, a charge converting unit periodically reset to a certain potential level, and producing an output potential signal from a series of charge packets, said output potential signal for each charge packet having a potential level and further comprising a reset term for changing said potential level thereof to said certain potential level, a signal term for changing said potential level thereof from a reset field-through level to a signal potential level representative of the amount of said each charge packet and a reset field-through term provided between said reset term and said signal term for maintaining said potential level thereof to said reset field-through level;

a charge transfer circuit electrically connected between said photo-electric converting unit and said charge converting unit, and conveying said photo carrier from said photo-electric converting unit to said charge converting unit as said series of charge packets; and an output amplifier circuit electrically connected to said charge converting unit for producing an image signal from said output potential signal, and including a signal amplifying circuit for increasing a magnitude of a potential signal, a reset field-through clamping circuit electrically connected to said signal amplifying circuit and providing a reference potential level corresponding to said reset field-through level for changing said image signal from said reference potential level, and a noise eliminating circuit electrically connected between said charge converting unit and said signal amplifying circuit and having a sampling-and-hold circuit for transferring a first potential level in said reset field-through term and a second potential in said signal term of said output potential signal;

wherein said sampling-and-hold circuit is responsive to a sampling control signal changed in both of said reset field-through term and said signal term for holding said first potential level in said reset field-through term and said second potential level in said signal term.

2. The solid state image pickup device as set forth in claim 1, in Which said sampling-and-hold circuit has a capacitor electrically connected to an input node of said signal amplifying circuit and holding said first potential level and said second potential level and a transfer transistor connected between said charge converting unit and said signal amplifying circuit and responsive to said sampling control signal for transferring said first potential level and said second potential level to said capacitor.

* * * * *